United States Patent [19]

Yamada et al.

[11] Patent Number: 5,029,032

[45] Date of Patent: Jul. 2, 1991

[54] MAGNETIC HEAD FOR HIGH DENSITY RECORDING

[75] Inventors: Taiki Yamada, Yamanashi; Masahiro Miyazaki, Nagaoka; Masayuki Arakawa, Yamanashi; Hideyuki Moriya, Yamanashi; Kazuhito Wakabayashi, Yamanashi; Kazuarki Suzuki, Funabashi; Koji Terazono, Yachiyo, all of Japan

[73] Assignee: TDK Corporation, Tokyo, Japan

[21] Appl. No.: 365,696

[22] Filed: May 25, 1989

[30] Foreign Application Priority Data

| Oct. 19, 1988 | [JP] | Japan | 63-263323 |
| Oct. 20, 1988 | [JP] | Japan | 63-266604 |
| Oct. 21, 1988 | [JP] | Japan | 63-265551 |
| Dec. 9, 1988 | [JP] | Japan | 63-311591 |
| Dec. 26, 1988 | [JP] | Japan | 63-328519 |
| Dec. 29, 1988 | [JP] | Japan | 63-334195 |

[51] Int. Cl.⁵ .................. G11B 5/147; G11B 5/235
[52] U.S. Cl. ....................... 360/126; 360/120
[58] Field of Search .................. 360/126, 125, 127

[56] References Cited

U.S. PATENT DOCUMENTS

| 4,535,376 | 8/1985 | Nomura et al. | 360/126 |
| 4,646,184 | 2/1987 | Goto et al. | 360/120 |
| 4,670,807 | 6/1987 | Gorter et al. | 360/125 |
| 4,755,899 | 7/1988 | Kobayashi et al. | 360/125 |
| 4,764,832 | 8/1988 | Enz et al. | 360/126 |
| 4,805,058 | 2/1989 | Takeuchi et al. | 360/126 |
| 4,887,177 | 12/1989 | Sillen | 360/126 |
| 4,890,378 | 1/1990 | Susuki | 360/126 |

Primary Examiner—John H. Wolff
Assistant Examiner—Craig A. Renner
Attorney, Agent, or Firm—Oblon, Spivak, McClelland, Maier & Neustadt

[57] ABSTRACT

A magnetic head includes first and second cores joined into a one-piece member through a nonmagnetic spacer. A DGL head has a low saturation magnetic flux density thin film disposed between the first core and the nonmagnetic spacer. An EDG head further has a high saturation magnetic flux density thin film disposed between the second core and the nonmagnetic spacer in the DGL head structure. The low saturation magnetic flux density thin film is formed of an amorphous alloy preferably having a saturation magnetic flux density of 1,500 to 3,000 G.

15 Claims, 4 Drawing Sheets

MAGNETIC HEAD FOR HIGH DENSITY RECORDING

BACKGROUND OF THE INVENTION

1. Field of the Invention

This invention relates to a magnetic head for use with magnetic recording media including floppy disks, magnetic tape, and hard disks, and more particularly to a write or read/write magnetic head

2. Prior Art

In writing and reading information in magnetic recording medium, it is preferred to use a magnetic head having a wide gap to provide an intense magnetic flux during writing But, it is preferred to use a magnetic head having a narrow gap to increase resolution during reproduction. A magnetic read/write head has a fixed gap length which must be a compromise between these two considerations.

One approach is the magnetic heads disclosed in U.S. Pat. No. 4,646,184 and corresponding Japanese Patent Application Kokai No. 60-87411, which are now known as dual gap length (DGL) type and enhanced dual gap length (EDG) type heads.

Referring to FIG. 1, there is illustrated a typical configuration of a DGL type magnetic head. First and second cores 1 and 2 are joined into a one-piece member through a nonmagnetic spacer 4 Disposed between the first core 1 and the nonmagnetic spacer 4 is a first thin film 3 having a lower saturation magnetic flux density than the cores. Two first thin films may be disposed on opposite sides of the spacer 4

FIG. 2 illustrates a typical configuration of an EDG type magnetic head The EDG head has generally the same structure as the DGL head of FIG. 1 In addition to the first thin film core and the nonmagnetic spacer 4. Two first thin films and two second thin films may be disposed on opposite sides of the spacer 4.

These DGL and EDG magnetic heads operate well both during writing and reading. During recording, the first or low saturation flux density thin film 3 is magnetically saturated so that it serves as a gap together with the nonmagnetic spacer 4, thus ensuring writing with a wider gap. During reproduction, the leakage magnetic flux that the magnetic recording medium develops during reproduction is too minute to magnetically saturate the first or low saturation flux density thin film 3. Thus the thin film 3 serves as a part of the first core 1 to ensure reproduction with a narrower gap, resulting in a high resolution. Particularly the EDG magnetic head ensures effective recording of a magnetic recording medium having a high coercive force because the second or high saturation flux density thin film 5 enables the application of a strong magnetic flux to the magnetic recording medium during writing.

In connection with these DGL and EDG magnetic heads, U.S. Pat. No. 4,646,184 proposes to form the low saturation flux density thin film 3 from a soft magnetic oxide material such as garnet. The second or high saturation flux density thin film 5 is disclosed as being formed from a crystalline soft magnetic material such as Permalloy and Sendust or an amorphous soft magnetic material Ferrite is used as the core.

To meet the above-mentioned requirements, the low saturation flux density thin film 3 must have a lower saturation magnetic flux density, a higher initial magnetic permeability, and a lower coercive force than ferrite commonly used as the core.

However, soft magnetic oxide materials have a lower limit of saturation magnetic flux density because of their crystal structure. To reduce the saturation magnetic flux density below the lower limit, particularly to 3,000 Gauss (G) or lower, a nonmagnetic material must be added to the soft magnetic oxide material. However, the nonmagnetic material added is present as islands in the crystal structure, leading to a drastic reduction of initial magnetic permeability. Although magnetic head materials prefer low coercive force, formulating soft magnetic oxide material to a low coercivity composition fails to provide the desired saturation magnetic flux density.

There are available no soft magnetic oxide materials which can meet all the requirements of low saturation magnetic flux density, high initial magnetic permeability, and low coercive force Currently available soft magnetic oxide materials are more or less unsatisfactory in read/write performance. More particularly, the magnetic heads of soft magnetic oxide material have a low reading output, and tend to be magnetized as a result of repeated cooperation with magnetic recording medium, resulting in a further reduction in reading output as well as a variation in electromagnetic properties. Since magnetization occurs if a soft magnetic oxide material assumes its inherent crystal structure, conditions for crystal growth must be carefully controlled Subsequent heat treatment is often necessary. These add to the difficulty of manufacture.

The soft magnetic oxide material shown in the example of said patent has a saturation magnetic flux density of 1,000 G. The soft magnetic oxide material having such an order of saturation magnetic flux density exhibits no effective magnetic permeability at room temperature because its Curie point is as low as about 40° C. Thus heads formed therefrom exhibit unstable magnetic properties and a low resolution. Also a problem arises upon overwrite recording.

The same discussion applies to ferrite.

Various crystalline metal materials are known as the soft magnetic material having a low saturation magnetic flux density. However, none of the thin films formed from these crystalline metal materials can meet all the requirements of low saturation magnetic flux density, high initial magnetic permeability, and low coercive force as the above-mentioned oxide thin films do not. Heads formed therefrom exhibit inconsistent electromagnetic properties and insufficient read/write properties.

The high saturation magnetic flux density thin film is formed from crystalline metal material such as Sendust according to the disclosure of said patent. A thin film which is formed on the core from such crystalline metal tends to be stressed during film formation since the crystal structure of the crystalline metal is different from that of the coreforming ferrite. Reaction can sometimes occur between the crystalline metal and the ferrite during subsequent heat treatment or glass fusion bonding. For these reasons, a pseudo-gap can form at the interface between the crystalline metal and the ferrite, that is, between the high saturation magnetic flux density thin film and the core, adversely affecting read/write properties, particularly reading properties.

A DGL or EDG magnetic head as shown in FIGS. 1 and 2 is generally formed by bonding the first and second cores 1 and 2 through the nonmagnetic spacer 4 and the thin films 3 and 5 into a one-piece member Bonding is preferably carried out by fusion welding with glass from the point of view of increased durability and productivity, particularly when a high mechanical strength is required for the head.

Where the low saturation magnetic flux density thin film 3 is formed from an amorphous material, it is very difficult to bond such a thin film to the core by fusion welding with glass. Where the low saturation magnetic flux density thin film 3 is formed from a crystalline material, fusion welding may employ a conventional glass having a relatively high working temperature Tw at which its viscosity reaches $10^4$ poise. This is because heating at a relatively high temperature does not substantially affect the magnetic properties of the thin film.

In contrast, amorphous material crystallizes above a certain temperature. Thus welding with a conventional glass having a relatively high working temperature Tw causes the amorphous material to crystallize. The resulting thin film exhibits an increased saturation magnetic flux density, an increased coercive force, and a reduced initial permeability, failing to provide satisfactory read/write properties.

Integral bonding of cores into a magnetic head must use a welding glass having a low working temperature Tw at which amorphous material does not crystallize. There is a need for a welding glass composition having such a low working temperature.

SUMMARY OF THE INVENTION

A primary object of the present invention is to provide a magnetic read/write head of the DGL or EDG type which has improved read/write properties including overwrite properties and resolution with no substantial loss thereof over the lifetime, and has stable temperature properties.

Another object of the present invention is to provide such a magnetic head which can be advantageously fabricated with consistent electromagnetic properties.

A further object of the present invention is to provide such a magnetic head capable of high density recording.

Still another object of the present invention is to provide such a magnetic head of the EDG type which is unlikely to form a pseudo-gap.

A yet further object of the present invention is to provide such a magnetic head of the DGL and EDG types which can achieve the above objects even when cores are joined with bonding glass.

According to the present invention, there is provided a magnetic head comprising first and second cores, a nonmagnetic spacer between the first and second cores, the first and second cores being joined together with the nonmagnetic spacer into a one-piece member, and a first thin film between the first core and the nonmagnetic spacer, having a lower saturation magnetic flux density than the first and second cores. The first thin film is of an amorphous alloy.

In a preferred embodiment, the first thin film has a saturation magnetic flux density of about 1,500 to about 3,000 G. It is formed of an amorphous alloy comprising (a) Co, (b) Fe, Ni, and/or Cr, and (c) Si, B, P, and/or C or comprising (a) Co, (b) Zr, Hf, Ti, Y, Si, and/or B, and (c) V, Nb, Ta, Cr, Mo, and/or W The cores may be formed of a ferrite having a saturation magnetic flux density of about 4,000 to about 6,000 G.

In another form of the invention, the magnetic head of the above-described arrangement further comprises a second thin film between the second core and the nonmagnetic spacer, having a higher saturation magnetic flux density than the first and second cores.

In a preferred embodiment, the second thin film has a saturation magnetic flux density of about 9,000 to about 4,000 G. It may be formed of an Fe-Al-Si base alloy, Fe-Ga-Si base alloy, or Fe-Si base alloy. In this embodiment, an underlay of a Permalloy may be disposed between the second core and the second thin film. Alternatively, the second thin film may be formed of an amorphous alloy similar to that defined for the first thin film.

Preferably, the first core is joined to the second core by fusion bonding with lead borosilicate glass

BRIEF DESCRIPTION OF THE DRAWINGS

The above and other objects, features, and advantages of the invention will be better understood from the following description taken in conjunction with the accompanying drawings, in which.

DETAILED DESCRIPTION OF THE INVENTION

Referring to FIGS. 1 to 6, there are illustrated in side elevation magnetic heads according to different embodiments of the present invention.

Figure 1:
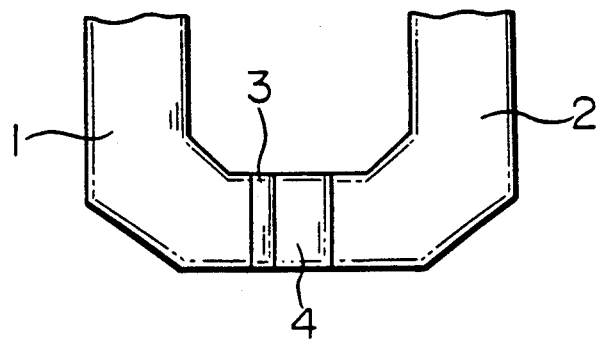
FIGS. 1 and 4 are side elevations of DGL type magnetic heads according to one embodiment of the present invention.

The magnetic head shown in FIG. 1 is one of the so-called DGL type. The head has a core including a first core 1 and a second core 2. The first and second cores 1 and 2 are joined together with a nonmagnetic spacer 4 into a one-piece member. A first or low saturation magnetic flux density thin film 3 is disposed between the first core 1 and the nonmagnetic spacer 4. The first thin film 3 has a lower saturation magnetic flux density than the core and is formed of an amorphous alloy Two first thin films may be disposed on opposite sides of the spacer 4.

The core consisting of the first and second cores 1 and 2 in this embodiment may preferably formed of a ferrite. The ferrite used herein is not particularly limited although a choice is preferably made of an Mn-Zn or Ni-Zn ferrite. The Mn-Zn ferrite has a preferred composition consisting essentially of about 50 to 60 mol % of $Fe_2O_3$, about 8 to 25 mol % of ZnO, and the balance being essentially MnO. The Ni-Zn ferrite exhibits improved properties particularly in the high frequency range and has a preferred composition consisting essentially of about 30 to 60 mol % of $Fe_2O_3$, about 15 to 50

The core preferably has a saturation magnetic flux density of about 3,000 to about 6,000 Gauss (G), more preferably about 4,500 to about 5,500 G when direct current is applied thereacross. With a saturation magnetic flux density of less than 4,000 G, there is a likelihood that a reduced impedance might reduce reading sensitivity and that a lowered Curie temperature might reduce thermal stability. Beyond the range, there is a likelihood that the resulting magnetic head might be adversely affected by increased coercive force and tend to be readily magnetized.

Preferably, the core has an initial magnetic permeability of about 1,000 to about 6,000 and a coercive force of up to 0.3 oersted (Oe) at 500 kHz.

The first or low saturation magnetic flux density thin film 3 serves as a gap together with the nonmagnetic spacer 4 during writing periods, but as a part of the first core 1 during reading periods.

More particularly, when the core is formed of Mn-Zn base ferrite, it preferably has a saturation magnetic flux density of about 4,000 to about 6,000 G and an initial magnetic permeability of about 3,000 to about 6,000 as measured at DC 500 kHz. When the core is formed of Ni-Zn base ferrite, it preferably has a saturation magnetic flux density of about 3,000 to about 4,000 G and an initial magnetic permeability of about 1,000 to about 2,000.

According to the present invention, the first or low saturation magnetic flux density thin film 3 is formed of an amorphous alloy. The amorphous magnetic alloy in thin film form exhibits a high initial magnetic permeability with minimal coercive force as compared with oxides and crystalline alloys. Thus the amorphous magnetic alloy can be incorporated as a thin film insert in DGL and EDG heads which have outstandingly excellent properties.

The first or low saturation magnetic flux density thin film 3 preferably has a saturation magnetic flux density of about 1,500 to about 3,000 Gauss (G), more preferably about 1,800 to about 2,500 G when direct current is applied thereacross.

With a composition having a saturation magnetic flux density below this range, there is a likelihood that the Curie temperature might be lowered to render temperature properties unstable. Resolution lowering is also expected. In addition, the magnetic head has a very high value of overwrite property However, this value is so high that when a magnetic recording medium which has been recorded with this magnetic head is subjected to overwrite recording with another magnetic head of ordinary property, overwrite erasing becomes difficult.

It is to be noted that the resolution of a head as used herein is expressed by (V2f/V1f)×100% wherein the head produces an output of V1f at a frequency of 1f and an output of V2f at a frequency of 2f.

The first or low saturation magnetic flux density thin film 3 having a saturation magnetic flux density beyond the above-defined range has a likelihood of reducing overwrite property.

Preferably, the first or low saturation magnetic flux density thin film 3 has an initial magnetic permeability of about 500 to about 3,000, especially about 1,000 to 3,000, and a coercive force of up to 0.2 Oe at 500 kHz. With an initial magnetic permeability below this range, there is a likelihood that the thin film 3 might encounter difficulty in serving as a part of the first core 1 during reproduction. Then it is unexpectable that the magnetic head can perform as a narrow gap head. As the initial magnetic permeability increases, the head increases its reading output. Higher the initial magnetic permeability, the better performs the head. An initial magnetic permeability of about 1,000 to 3,000 is available with the use of amorphous material of the composition later described. The first or low saturation magnetic flux density thin film 3 of amorphous material may have a coercive force as low as 0.2 Oe or lower even in thin film form.

In a preferred embodiment of the invention, the first or low saturation magnetic flux density thin film 3 is formed of an amorphous alloy comprising (a) Co, (b) at least one member selected from the group consisting of Fe, Ni, and Cr, and (c) at least one member selected from the group consisting of Si, B, P, and C. In another preferred embodiment of the invention, the first thin film is formed of an amorphous alloy comprising (a) Co, (b) at least one member selected from the group consisting of Zr, Hf, Ti, Y, Si, and B, and (c) at least one member selected from the group consisting of V, Nb, Ta, Cr, Mo, and W. These compositions tend to be amorphous and exhibit the desired properties.

In the former embodiment wherein the first thin film 3 is of an amorphous alloy containing (a) cobalt, (b) iron, nickel and/or chromium, and (c) silicon, boron, phosphorus and/or carbon, the preferred alloy has an atomic composition of the following formula because the desired magnetic properties are obtained.

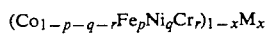

$$(Co_{1-p-q-r}Fe_pNi_qCr_r)_{1-x}M_x$$

In the formula, M is at least one member selected from the group consisting of Si, B, P, and C, letters x, p, q, and r are within the ranges:

$$0.05 \leq x \leq 0.3,$$

$$0 \leq p \leq 0.15,$$

$$0 \leq q \leq 0.55, \text{ and}$$

$$0 \leq r \leq 0.1,$$

all p, q, and r are not equal to zero at the same time.
Preferably, $0.04 \leq p+q+r \leq 0.2$.

Preferably, M is a mixture of two, three or four of Si, B, P and C. Mixtures of Si +B, B +P, and P +C optionally containing one or two of the remaining elements are more preferred. The ratio of elements may vary over a wide range.

The composition defined above may contain up to 10 atom % of the entire composition of at least one transition metal element selected from the group consisting of Ti, Mn, Ru, Rh, Pt, Os, Nb, Zr, Hf, Ta, and W. Also, there may be contained up to 10 atom % of the entire composition of at least one metalloid element selected from the group consisting of Ge and Al.

The composition defined above provides the first thin film 3 with improved abrasion resistance and expedites film formation.

In the latter embodiment wherein the first thin film 3 is of an amorphous alloy containing (a) cobalt, (b) zirconium, hafnium, titanium, yttrium, silicon and/or boron and (c) vanadium, niobium, tantalum, chromium, molybdenum, and/or tungsten, the preferred alloy has the following composition.

The content of cobalt preferably ranges from 70 to 80 atom %, more preferably from 72 to 78 atom %. Part of cobalt may be replaced by Fe, Ni and/or Mn. Substitution of these elements for cobalt is preferably up to 30 atom % in total. The content of at least one member (b) selected from the group consisting of Zr, Hf, Ti, Y, Si, and B preferably ranges up to 30 atom %, more preferably from 5 to 25 atom %. The content of at least one member (c) selected from the group consisting of V, Nb, Ta, Cr, Mo, and W preferably ranges up to 30 atom %, more preferably from 5 to 25 atom %. The desired properties are readily available from alloy compositions of the above-defined range.

The first or low saturation magnetic flux density thin film 3 preferably has a thickness of from about 0.3 to about 5 μm, more preferably from about 0.6 to about 2 μm although the exact thickness depends on a particular application. A film of thinner than 0.3 μm will be difficult to meet both the writing and reading requirements because only a small difference is available in effective gap length during writing and reading. A film of thicker than 5 μm will increase the effective gap length during writing so that an increased power is necessary for writing.

Figure 2:
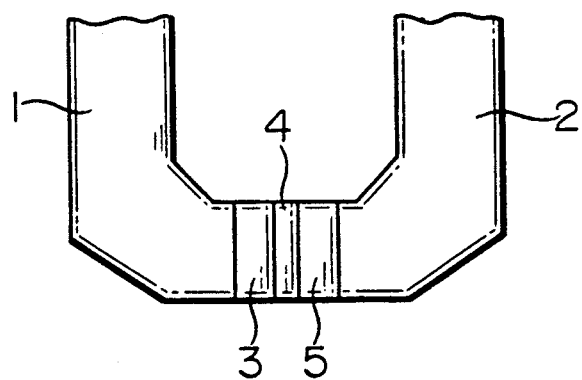
FIGS. 2, 3, 5, and 6 are side elevations of EDG type magnetic heads according to another embodiment of the present invention.

The magnetic head shown in FIG. 2 is of the so-called EDG type. It has all the components of the DGL head shown in FIG. 1, that is, the first and second cores 1 and 2, the first thin film 3, and the nonmagnetic spacer 4. In addition, a second thin film 5 is disposed between the second core 2 and the nonmagnetic spacer 4. The second thin film 5 has a higher saturation magnetic flux density than the core. Two first thin films and two second thin films may be disposed on opposite sides of the spacer 4, with the order of core-high-low-spacer-low-high-core wherein high and low means high and low saturation magnetic flux density thin films.

The second or high saturation magnetic flux density thin film 5 is provided for the purpose of developing a high density magnetic flux upon writing. The magnetic head with the second or high saturation magnetic flux density thin film 5 is effective in recording a magnetic recording medium having a high coercive force, enabling high density recording.

In a preferred embodiment, the second or high saturation magnetic flux density thin film 5 is formed from an alloy containing iron and silicon. The Fe-Si base alloy used herein is not particularly limited although a preferred alloy has an abrasion resistance approximately equal to that of the first or low saturation magnetic flux density thin film 3 previously described. Abrasion resistance is necessary to avoid local abrasion of the magnetic head contact surface.

The second or high saturation magnetic flux density thin film 5 preferably has a saturation magnetic flux density of about 9,000 to about 14,000 G, more preferably about 9,000 to about 11,000 G when direct current is applied thereacross.

With a saturation magnetic flux density below the range, there is a likelihood that the head might not generate a high density magnetic flux sufficient to carry out recording in a magnetic recording medium having a high coercive force, which is inadequate for high density recording. Beyond the range, there is a likelihood that magnetostriction is markedly increased, magnetic permeability is markedly reduced, and coercive force reaches several oersted or higher so as to create residual magnetization, resulting in recording demagnetization, S/N lowering, and increased writing current.

Preferably, the second or high saturation magnetic flux density thin film 5 has an initial magnetic permeability of about 500 to about 3,000, especially about 1,000 to 3,000, and a coercive force of up to 0.2 Oe at 500 kHz.

Preferably, the second or high saturation magnetic flux density thin film 5 is formed of an Fe-Al-Si alloy (Sendust), Fe-Ga-Si alloy or Fe-Si alloy.

Preferred Fe-Al-Si alloys include alloys comprising about 2 to 6% by weight of Al, about 6 to 12% by weight of Si, and the balance of iron as well as Sendust. Preferred Fe-Ga-Si alloys include alloys comprising about 5 to 15% by weight of Ga, about 7 to 20% by weight of Si, and the balance of iron. Preferred Fe-Si alloys include alloys comprising about 0.5 to 10% by weight, more preferably about 1 to 6% by weight of Si and the balance of iron. In all these alloys, there may be present up to about 3% by weight of an additive element such as chromium.

In another preferred embodiment, the second or high saturation magnetic flux density thin film 5 is formed of an amorphous alloy. A choice may be made of an amorphous alloy having an abrasion resistance approximately equal to that of the first or low saturation magnetic flux density thin film 3 previously described in order to avoid local abrasion of the magnetic head contact surface.

In a preferred embodiment of the invention, the second or high saturation magnetic flux density thin film 5 is formed of an amorphous alloy comprising (a) Co, (b) at least one member selected from the group consisting of Fe, Ni, and Cr, and (c) at least one member selected from the group consisting of Si, B, P, and C. In another preferred embodiment of the invention, the second thin film is formed of an amorphous alloy comprising (a) Co, (b) at least one member selected from the group consisting of Zr, Hf, Ti, Y, Si, and B, and (c) at least one member selected from the group consisting of V, Nb, Ta, Cr, Mo, and W. These compositions tend to be amorphous and exhibit the desired properties.

In the former embodiment wherein the second thin film 5 is of an amorphous alloy containing (a) cobalt, (b) iron, nickel and/or chromium, and (c) silicon, boron, phosphorus and/or carbon, the preferred alloy has an atomic composition of the following formula because the desired magnetic properties are obtained.

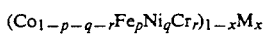

In the formula, M is at least one member selected from the group consisting of Si, B, P, and C, letters x, p, q, and r are within the ranges:

$0.05 \leq x \leq 0.2$, $0 \leq p \leq 0.15$, $0 \leq q \leq 0.55$, and $0 \leq r \leq 0.1$, all p, q, and r are not equal to zero at the same time.

Preferably, $0.04 \leq p+q+r \leq 0.2$.

Preferably, M is a mixture of two, three or four of Si, B, P and C. Mixtures of Si+B, B+P, and P+C optionally containing one or two of the remaining elements are more preferred. The ratio of elements may vary over a wide range.

The composition defined above may contain up to 10 atom% of the entire composition of at least one transition metal element selected from the group consisting of Ti, Mn, Ru, Rh, Pt, Os, Nb, Zr, Hf, Ta, and W. Also, there may be contained up to 10 atom% of the entire composition of at least one metalloid element selected from the group consisting of Ge and Al.

The composition defined above provides the second thin film 5 with improved abrasion resistance and expedites film formation.

In the latter embodiment wherein the second thin film 5 is of an amorphous alloy containing (a) cobalt, (b) zirconium, hafnium, titanium, yttrium, silicon and/or boron and (c) vanadium, niobium, tantalum, chromium, molybdenum, and/or tungsten, the preferred alloy has the following composition.

The content of cobalt preferably ranges from 75 to 95 atom%, more preferably from 80 to 90 atom%. Part of cobalt may be replaced by Fe, Ni and/or Mn. Substitution of these elements for cobalt is preferably up to 30 atom% in total. The content of at least one member (b) selected from the group consisting of Zr, Hf, Ti, Y, Si, and B preferably ranges up to 30 atom%, more preferably from 5 to 25 atom%. The content of at least one member (c) selected from the group consisting of V, Nb, Ta, Cr, Mo, and W preferably ranges up to 30 atom%, more preferably from 5 to 25 atom%. The desired properties are readily available from alloy compositions of the above-defined range.

The second or high saturation magnetic flux density thin film 5 preferably has a thickness of from about 0.2 to about 5 m, more preferably from about 0.5 to about 3 $\mu$m although the exact thickness depends on a particular application. A thickness below the range means that the second thin film has a small volume so that it may be readily magnetically saturated, which is undesirable for the intended functions. Beyond the range, the second thin film is increased in abrasion and eddy current loss.

The magnetic head having the second or high saturation magnetic flux density thin film 5 as defined above is effective in recording data in a magnetic recording medium having a coercive force of at least 900 Oe, particularly 900 to 1,500 Oe.

The first and second thin films 3 and 5 as defined above may preferably formed by conventional well-known vapor phase deposition processes including sputtering, evaporation and chemical vapor deposition (CVD). Sputtering is most preferred.

If a thin film as deposited has magnetic anisotropy induced, the film may be heat treated at a temperature below the crystallization temperature in a static or rotary magnetic field to remove anisotropy.

The magnetic head exhibits a high resolution when the core consisting of first and second cores 1 and 2, the first thin film 3, and the second thin film 5 all have a saturation magnetic flux density within the above-defined ranges. The head is also improved in overwrite recording because it exhibits improved overwrite property as demonstrated by a value in the range from −40 dB to −30 dB.

The nonmagnetic spacer 4 serves as a gap during reading and is formed of a nonmagnetic material such as $SiO_2$ and glass. A nonmagnetic space is contemplated to be included in the nonmagnetic spacer 4. Preferably the nonmagnetic spacer 4 has a thickness, that is, reading gap length of from about 0.1 to about 2.0 $\mu$m, more preferably from about 0.1 to about 1.0 $\mu$m, most preferably from about 0.1 to about 0.4 $\mu$m. This gap length range ensures high density recording.

Figure 3:
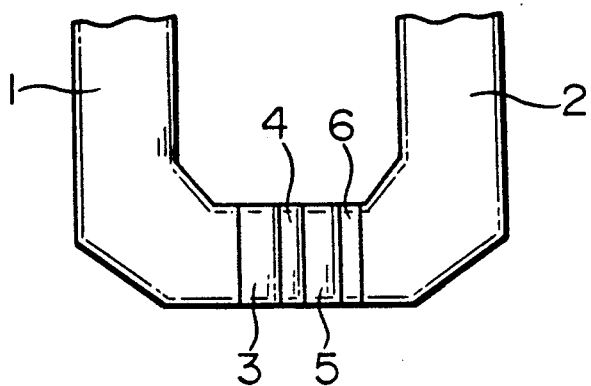

FIG. 3 shows a further embodiment of the magnetic head in which an underlay 6 is disposed between the second core 2 and the second thin film 5. The remaining components are the same as in the EDG magnetic head shown in FIG. 2.

The underlay 6 is preferably formed of a material having a crystalline structure compatible or analogous with both the crystalline structures of the second core 2 and the second thin film 5. The presence of such an underlay not only eliminates stresses which are otherwise induced in the second thin film 5 during its formation due to the difference in crystalline structure from the underlying substrate or second core 2, but is also effective in preventing reaction during glass bonding or other processing and development of a pseudo-gap. Because of such functions, the underlay 6 is preferably provided when the second thin film 5 is formed of an Fe-Al-Si, Fe-Ga-Si or Fe-Si alloy as previously described, and is particularly effective when the second thin film 5 is formed of an Fe-Al-Si alloy. The underlay 6 is also effective in improving the adherence between the core and the thin film.

The material of which the underlay 6 is formed is not particularly limited insofar as the above-mentioned requirements are met. Preferred are Permalloy, Toughperm, and Alperm. Permalloy is most preferred. Permalloy has the preferred composition consisting essentially of about 75 to added up to 10% by weight of Mo, Mn, Nb, or Cr for the purpose of improving abrasion resistance.

The underlay 6 is preferably formed by sputtering.

The underlay 6 preferably has a saturation magnetic flux density of about 9,000 to about 14,000 G under DC application, an initial magnetic permeability of about 500 to about 3,000 at 500 kHz, and a coercive force of up to 1.0 Oe.

Preferably the underlay 6 is from about 0.003 to about 1 $\mu$m thick, more preferably from about 0.003 to about 0.3 $\mu$m.

According to the present invention, the first and second cores 1 and 2 are joined through the nonmagnetic spacer 4 into a one-piece member magnetic head. Joining may be carried out by any commonly used bonding techniques. Preferably bonding glass is used for integrating purpose.

Figure 4:
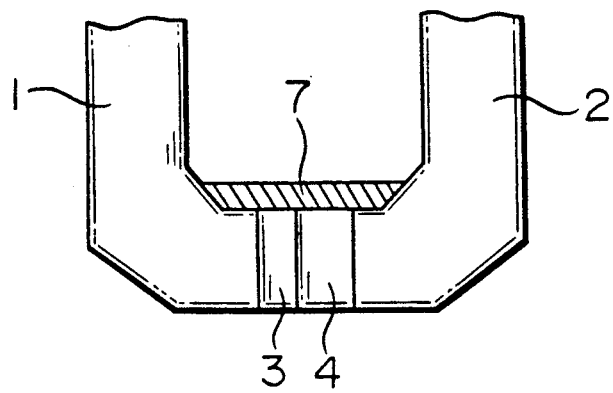
Figure 5:
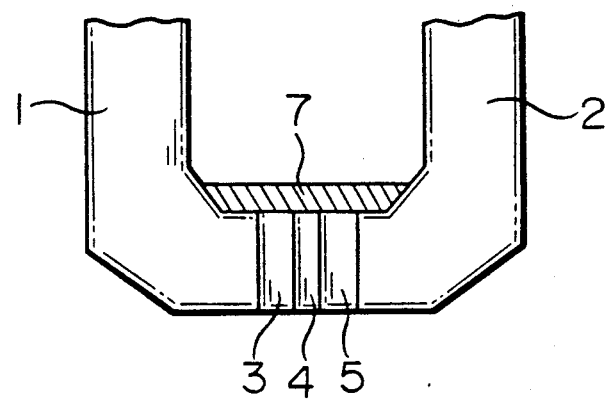
Figure 6:
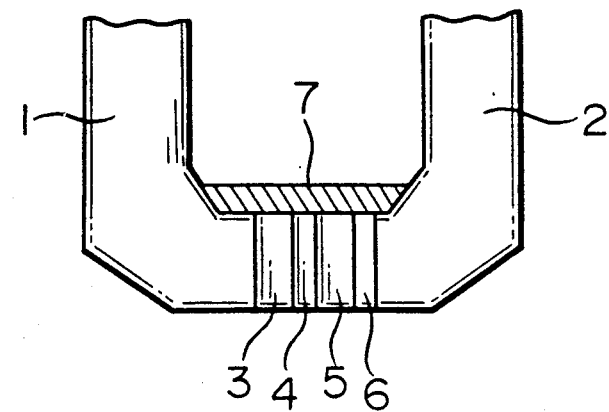

FIGS. 4, 5, and 6 show the magnetic heads corresponding to those of FIGS. 1, 2, and 3 in which a glass bond 7 is used to accomplish integral joining of the head components.

Any fusion bondable glass compositions may be used herein although lead borosilicate glass is preferred.

The lead borosilicate glass for fusion bonding has a preferred composition comprising about 60 to about 80% by weight of PbO, about 1 to about 15% by weight of $B_2O_3$, and about 5 to about 20% by weight of $SiO_2$. Most preferred is a lead borosilicate glass composition comprising about 65 to about 75% by weight of PbO, about 4 to about 13% by weight of $B_2O_3$, and about 6 to about 15% by weight of $SiO_2$. Outside the range, the glass has a too high working temperature Tw. (The working temperature Tw is the temperature at which the glass viscosity reaches $10^4$ poise.) Bonding with such glass having a high working temperature would cause the first or low saturation magnetic flux density thin film 3 of amorphous material to crystallize, the film losing the desired magnetic properties. If the second or high saturation magnetic flux density thin film 5 is of amorphous material, it would also crystallize during bonding, losing the desired magnetic properties.

Preferably, the lead borosilicate glass of the above-described composition may further contain at least one member selected from the group consisting of $Al_2O_3$, ZnO and $Bi_2O_3$. Particularly, there are present up to 5%

, more preferably up to 3%, most preferably 0.5 to 3% by weight of $Al_2O_3$, up to 2%, more preferably up to 8%, most preferably 2 to 8% by weight of ZnO, and up to 15%, more preferably up to 10%, most preferably 3 to 10% by weight of $Bi_2O_3$.

The lead borosilicate glass having the above-described composition has a working temperature Tw of from 450° to 580° C. Bonding at these temperatures causes little or no crystallization.

The lead borosilicate glass described above may additionally contain up to 6% by weight of $Na_2O$, up to 3% by weight of $K_2O$, up to 2% by weight of NiO, up to 2% by weight of $Cr_2O_3$, up to 2% by weight of CoO, or up to 2% by weight of $Fe_2O_3$ or a mixture thereof.

The above-described lead borosilicate glass may be prepared by a conventional process and used in fusion bonding at a temperature in proximity to its working temperature Tw by a conventional process.

The magnetic head of the present invention may be integrated with a slider to form a head assembly, if desired.

The magnetic head of the present invention will find a wide variety of applications in various computers as floppy heads for overwrite recording, for example, tunnel erase type heads including laminate and bulk types, and read/write heads free of an erase head, and as floating heads including monolithic and composite types. Any well-known modes of overwrite recording can be carried out with the magnetic head of the present invention.

In the DGL and EDG magnetic heads capable of wide gap writing and narrow gap reading, the first or low saturation magnetic flux density thin film is formed of an amorphous material according to the present invention. The magnetic heads of the invention thus have many advantages of improved read/write properties including overwrite ability and resolution, retention of such properties, stable temperature properties, minimized local abrasion, and high density recording.

Particularly when the first thin film has a low saturation magnetic flux density within the specific range, both the requirements of resolution and overwrite ability are met. In this embodiment wherein the first thin film has a Curie temperature of at least 100° C., temperature properties are better. Further, the first thin film is improved in abrasion resistance and film formability. Particularly in the case of EDG magnetic heads, local abrasion is eliminated because the low and high saturation magnetic flux density thin films may have the same order of abrasion resistance.

In the EDG magnetic heads in which the high saturation flux density thin film is formed of a crystalline material, provision of an underlay of a compatible crystalline structure between the core and the high saturation flux density thin film prevents occurrence of distortion in the high saturation flux density thin film due to the difference in crystalline structure between the core and the thin film. As a result, recording/reproducing properties are improved since no pseudo-gap can be created.

In the EDG magnetic heads in which the high saturation flux density thin film is formed of an amorphous material, improved recording/reproducing properties are expectable since little pseudo-gap can be created as opposed to the thin film of a crystalline material. Since both the low and high saturation flux density thin films are formed of hard materials; the magnetic head has improved abrasion resistance and minimized local abrasion.

Bonding lead borosilicate glass having a relatively low working temperature Tw is used to join the components into a one-piece magnetic head. The low saturation flux density thin film crystallizes little during fusion bonding. The components are joined by fusion bonding with glass without losing the above-mentioned advantageous properties.

EXAMPLE

Examples of the present invention are given below by way of illustration and not by way of limitation.

Example 1

A DGL magnetic head as shown in FIG. 1 was fabricated.

The first or low saturation magnetic flux density thin film 3 having a composition of Co 75 at %, Zr 10 at %, and Mo 15 at % was formed by sputtering at a rate of 1,000 Å/min. to a thickness of 0.8 $\mu$m. The resulting thin film was amorphous and had a DC saturation flux density of 2,500 G, a specific initial permeability of 15,000 (an initial permeability of 1,500 at 500 kHz), and a coercive force of 0.15 Oe.

The cores were formed of an Mn-Zn ferrite having a DC saturation flux density of 5,500 G, an initial permeability of 3,000, a coercive force of 0.1 Oe.

The nonmagnetic spacer 4 was formed from $SiO_2$ and had a thickness of 0.4 $\mu$m. A conductor was wound around the head to form a coil of 100×2 turns in a conventional manner.

The magnetic head was operated with a floppy disk having a coercive force Hc of 800 Oe and a Br of 900 G at a track width of 120 $\mu$m to determine read/write properties. The head was set such that the first or low saturation magnetic flux density thin film 3 was on the leading side relative to the rotating floppy disk.

Figure 7:
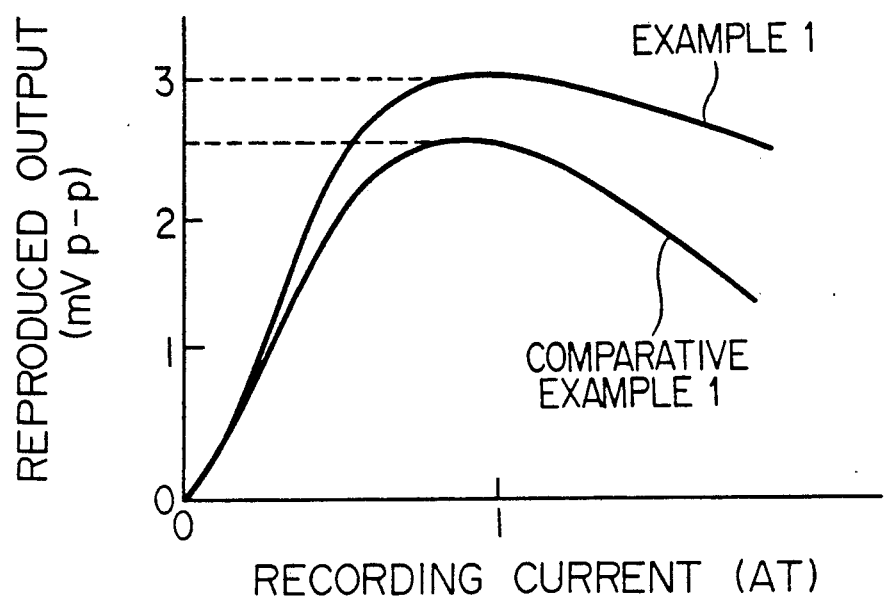
FIG. 7 is a diagram showing the reproduced output of the magnetic heads of Example 1 and Comparative Example 1 as a function of recording current.
Figure 8:
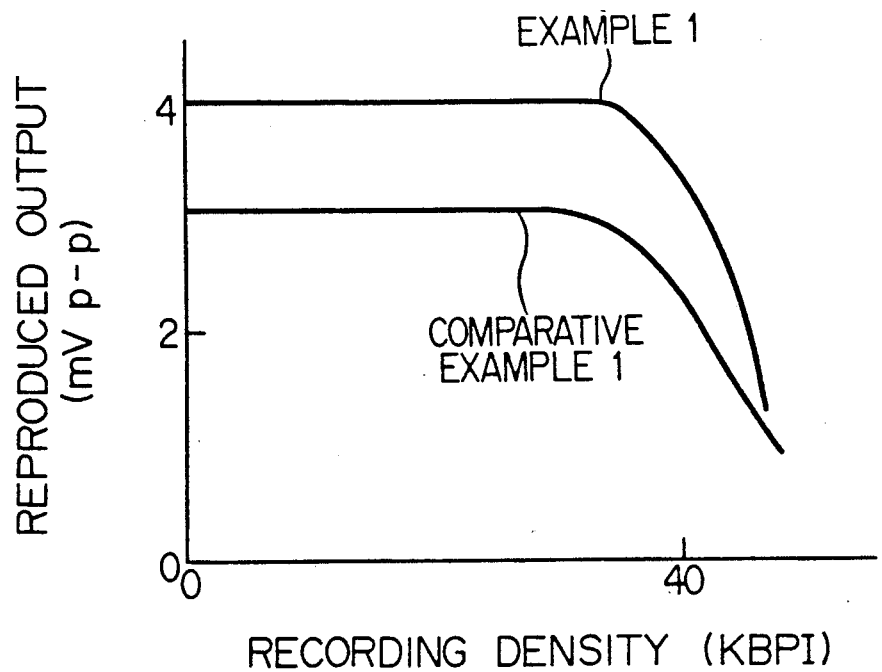
FIG. 8 is a diagram showing the reproduced output of the magnetic heads of Example 1 and Comparative Example 1 as a function of recording density.

The results are plotted in diagrams. FIG. 7 shows the reproduced output (in millivolt peak-to-peak) of the head as a function of recording current (in AT) at 250 kHz. FIG. 8 shows the reproduced output (in millivolt peak-to-peak) of the head as a function of recording density (KBPI or kilobit per inch). FIG. 7 shows how the reproduced output of the head changes with the number of reproducing operations after recording. A percent change is on the ordinate.

Example 2

Several magnetic heads were fabricated by the same procedure as in Example 1 except that the first or low saturation magnetic flux density thin film 3 was replaced by amorphous thin films of the following compositions.

| Designation | Composition | | |
| --- | --- | --- | --- |
| 2-1 | Co 70 at % | Ti 15 at % | Cr 15 at % |
| 2-2 | Co 75 at % | Zr 10 at % | Cr 15 at % |
| 2-3 | Co 80 at % | Hf 8 at % | Ta 12 at % |

These heads were determined for read/write properties by the same procedure as in Example 1. They produced equivalent read/write properties to the head of Example 1.

Comparative Example 1

A magnetic head was fabricated by the same procedure as in Example 1 except that the first or low saturation magnetic flux density thin film 3 was replaced by a spinel structure oxide soft magnetic thin film having a DC saturation flux density of 2,500 G, an initial permeability of 1,000, and a coercive force of 0.3 Oe. The thin film was formed by sputtering and then heat treated at 500° C.

Figure 9:
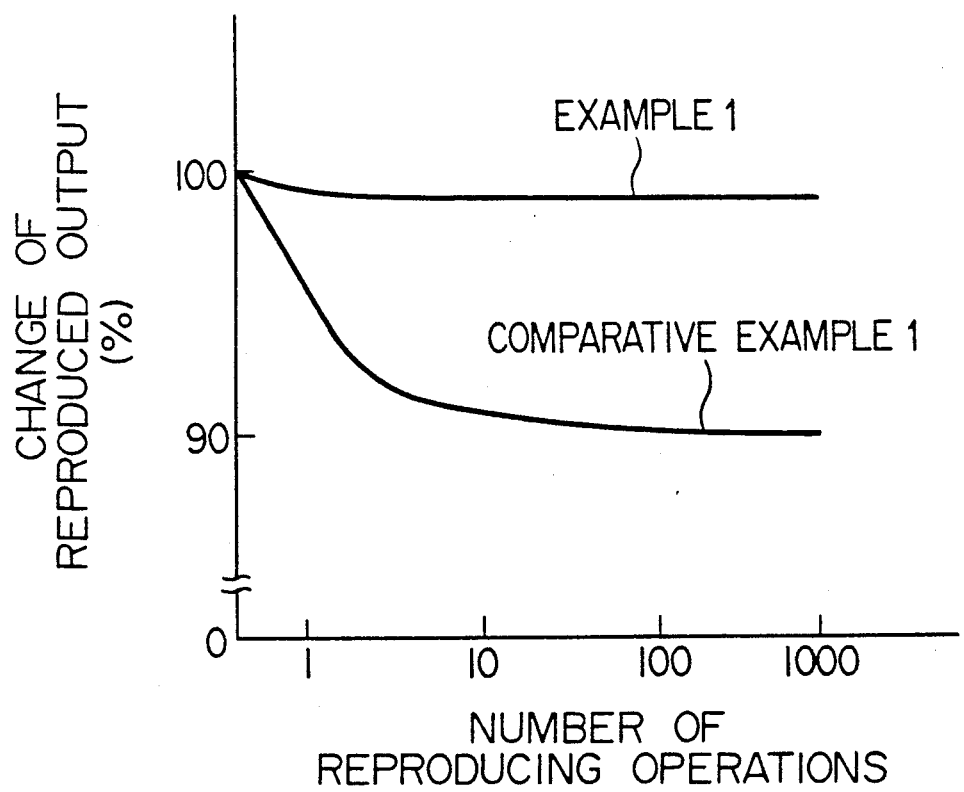
FIG. 9 is a diagram showing a change in the reproduced output of the magnetic heads of Example 1 and Comparative Example 1 with the number of reproducing operations after recording.

The results are also plotted in the diagrams of FIGS. 7, 8 and 9. As seen from these diagrams, the magnetic head of Example 1 can reproduce a higher output than the prior art head and maintain it for a greater number of operations.

Another magnetic head was fabricated by replacing the oxide soft magnetic thin film by a crystalline metal (Ni-Cu) thin film having a DC saturation flux density of 2,500 G, an initial permeability of 1,000, and a coercive force of 0.3 Oe. The results are similar to those of the oxide soft magnetic thin film.

Both the oxide soft magnetic thin film and the crystalline metal thin film were inconsistent by lot in reproduced output. The heads of Examples 1 and 2 showed no or little variation in properties.

Example 3

A DGL magnetic head as shown in FIG. 1 was fabricated.

The first or low saturation magnetic flux density thin film 3 was formed from a variety of compositions. The compositions are shown in Table 1 along with their DC saturation flux density, initial permeability, coercive force, and Curie temperature. The thin film of 1.0 μm thick was formed by sputtering.

The cores were formed of an Mn-Zn ferrite having a DC saturation flux density of 4,500 G, an initial permeability of 3,000, a coercive force of 0.1 Oe.

The nonmagnetic spacer 4 was formed from $SiO_2$ and had a thickness of 0.4 μm. A conductor was wound around the head to form a coil of 100×2 turns in a conventional manner.

The magnetic head was operated with a floppy disk having a coercive force Hc of 600 Oe at a track width of 120 μm to determine the following properties. The head was set such that the first or low saturation magnetic flux density thin film 3 was on the leading side relative to the rotating floppy disk.

Overwrite ability

A signal having a frequency 1f of 250 kHz was recorded in the disk and another signal having a frequency 2f of 500 kHz was then overwritten. Overwrite ability was evaluated by dividing the 1f-signal output after overwriting by the 1f-signal output prior to overwriting. The overwrite ability was evaluated satisfactory when the value is between −30 dB and −40 dB. A value of higher than −30 dB is insufficient as overwrite ability. An overwrite value of lower than −40 dB is great as such, but impractical in view of interchangeability with magnetic heads other than the present invention.

Resolution

A signal having a frequency 1f of 250 kHz was recorded in the disk and then reproduced to give an output V1f. Another signal having a frequency 2f of 500 kHz was recorded and then reproduced to give an output 2f. The resolution is defined as output V2f divided by V1f.

$$V2f/V1f \times 100\%$$

A resolution of less than about 70% is short for practical use.

The results are shown in Table 1.

TABLE 1

| Sample No. | Composition (at %) | Low saturation flux density thin film | | | | Overwrite ability (dB) | Resolution (%) |
|---|---|---|---|---|---|---|---|
| | | Saturation flux density(G) | Initial permeability | Coercive force(Oe) | Curie Temp. (°C.) | | |
| 101 | $Fe_{4.5}Co_{70.5}Si_{15}B_{10}$ | 2500 | 2300 | 0.02 | 180 | −34 | 76 |
| 102 | $Fe_{4.5}Co_{65.5}Ni_5Si_{15}B_{10}$ | 2000 | 2500 | 0.01 | 140 | −36 | 74 |
| 103 | $Fe_{4.5}Co_{65.5}Cr_5Si_{15}B_{10}$ | 1600 | 3200 | 0.05 | 125 | −38 | 72 |
| 104 | $Fe_{4.5}Co_{60}Ni_{5.5}Cr_5Si_{15}B_{10}$ | 1080 | 3600 | 0.03 | 95 | −42 | 70 |
| 105 | $Fe_{4.5}Co_{70.5}P_{15}B_{10}$ | 2700 | 2800 | 0.20 | 200 | −33 | 77 |
| 106 | $Fe_{4.5}Co_{65.5}Ni_5P_{15}B_{10}$ | 2200 | 2200 | 0.18 | 150 | −35 | 77 |
| 107 | $Fe_{4.5}Co_{65.5}Cr_5P_{15}B_{10}$ | 1850 | 2600 | 0.18 | 135 | −37 | 73 |
| 108 | $Fe_{4.5}Co_{65.5}Zr_5Si_{15}B_{10}$ | 1800 | 1900 | 0.18 | 135 | −37 | 73 |
| 109 | $Fe_{4.5}Co_{65.5}Hf_5Si_{15}B_{10}$ | 1800 | 2000 | 0.20 | 135 | −37 | 73 |
| 110 | $Fe_{4.5}Co_{60}Cr_{5.5}W_5Si_{15}B_{10}$ | 900 | 2400 | 0.15 | 100 | −43 | 68 |
| 111 | $Co_{70}Ni_5Si_{15}B_{10}$ | 3000 | 2000 | 0.20 | 230 | −31 | 78 |
| 112 | $Co_{70}Ni_5P_{15}B_{10}$ | 3000 | 1700 | 0.20 | 240 | −31 | 78 |

As seen from the data of Table 1, the magnetic heads of the invention had improved overwrite ability and resolution.

The magnetic heads of the invention produced a high output and exhibited excellent abrasion resistance. The low saturation magnetic flux density thin films used in the magnetic heads of the invention could be formed at an increased rate and had improved properties.

Example 4

EDG magnetic heads as shown in FIG. 2 were fabricated.

The first or low saturation magnetic flux density thin film 3 was formed from a variety of compositions. The compositions are shown in Table 2 along with their DC saturation flux density, initial permeability, coercive force, and Curie temperature. The first thin film of 2.0 μm thick was formed by sputtering.

The second or high saturation magnetic flux density thin film 5 was formed from a variety of compositions. The compositions are shown in Table 2 along with their DC saturation flux density, initial permeability, and coercive force. The second thin film of 2.0 μm thick was formed by sputtering.

The cores were formed of an Mn-Zn ferrite having a DC saturation flux density of 5,500 G, an initial permeability of 3,000, a coercive force of 0.1 Oe.

The nonmagnetic spacer 4 was formed from $SiO_2$ and had a thickness of 0.4 μm. A conductor was wound around the head to form a coil of 100×2 turns in a conventional manner.

The magnetic head was operated with a floppy disk having a coercive force Hc of 900 Oe at a track width of 120 μm to determine the overwrite and resolution. The head was set such that the first or low saturation magnetic flux density thin film 3 was on the leading side relative to the rotating floppy disk. The measurement procedures were the same as described in Example 3.

The results are shown in Table 2.

The second or high saturation magnetic flux density thin film 5 was formed from a variety of compositions. The compositions are shown in Table 3 along with their DC saturation flux density, initial permeability, and coercive force. The second thin film of 2.0 μm thick was formed by sputtering.

The cores were formed of an Mn-Zn ferrite having a DC saturation flux density of 4,500 G, an initial permeability of 3,000, a coercive force of 0.1 Oe.

The nonmagnetic spacer 4 was formed from $SiO_2$ and had a thickness of 0.4 μm. A conductor was wound around the head to form a coil of 100×2 turns in a

TABLE 2

| | High saturation flux density thin film | | | Low saturation flux density thin film | | | | | Over- | |
|---|---|---|---|---|---|---|---|---|---|---|
| Sample No. | Composition (at %) | Saturation flux density(G) | Initial permeability | Coercive force (Oe) | Composition (at %) | Saturation flux density(G) | Initial permeability | Coercive force (Oe) | Curie Temp. (°C.) | write ability (dB) | Resolution (%) |
| 201 | $Fe_{85}Si_9Al_5Cr_1$ | 11000 | 2800 | 0.15 | $Co_{75}Zr_{10}Mo_{15}$ | 2500 | 1500 | 0.15 | 350 | −33 | 80 |
| 202 | $Fe_{85}Si_9Al_5Cr_1$ | 11000 | 2800 | 0.15 | $Co_{75}Zr_{15}Cr_{10}$ | 2200 | 1500 | 0.20 | 310 | −35 | 77 |
| 203 | $Fe_{85}Si_9Al_5Cr_1$ | 11000 | 2800 | 0.15 | $Co_{73}Zr_{15}Mo_{12}$ | 2000 | 2000 | 0.10 | 280 | −38 | 74 |
| 204 | $Fe_{85}Si_9Al_5Cr_1$ | 11000 | 2800 | 0.15 | $Co_{73}Zr_{15}Cr_{12}$ | 1800 | 2000 | 0.15 | 180 | −40 | 72 |
| 205 | $Fe_{85}Si_9Al_5Cr_1$ | 11000 | 2800 | 0.15 | $Co_{78}Zr_{10}Mo_{12}$ | 3500 | 500 | 2.5 | 450 | −20 | 82 |
| 206 | $Fe_{85}Si_9Al_5Cr_1$ | 11000 | 2800 | 0.15 | $Co_{72}Zr_{16}Cr_{12}$ | 1300 | 1000 | 0.6 | 80 | −45 | 65 |
| 207 | $Fe_{86}Si_8Al_5Cr_1$ | 11800 | 2500 | 0.2 | $Co_{75}Zr_{10}Mo_{15}$ | 2500 | 1500 | 0.15 | 350 | −37 | 80 |
| 208 | $Fe_{84}Si_{10}Al_5Cr_1$ | 10500 | 2400 | 0.2 | $Co_{75}Zr_{15}Cr_{10}$ | 2200 | 1500 | 0.20 | 310 | −36 | 77 |
| 209 | $Fe_{90}Si_4Al_5Cr_1$ | 13200 | 300 | 5.0 | $Co_{75}Zr_{10}Mo_{15}$ | 2500 | 1500 | 0.15 | 350 | −45 | 80 |
| 210 | $Fe_{80}Si_{14}Al_5Cr_1$ | 8600 | 500 | 3.0 | $Co_{75}Zr_{15}Cr_{10}$ | 2200 | 1500 | 0.20 | 310 | −30 | 77 |

Sample Nos. 205, 209, and 210 failed to reproduce a satisfactory output.

The effectiveness of the invention is apparent from the data of Table 2.

Example 5

Magnetic heads were fabricated by the same procedure as in Example 4 except that the second or high saturation magnetic flux density thin film was replaced by the following compositions:
$Fe_{77}Ga_9Si_{14}$ (wt %) and
$Fe_{95.5}Si_{4.5}$ (wt %).

The heads were evaluated as in Example 4. It was found that their properties were equivalent to those samples of Example 4 within the scope of the invention.

Example 6

EDG magnetic heads as shown in FIG. 2 were fabricated.

The first or low saturation magnetic flux density thin film 3 was formed from a variety of compositions. The compositions are shown in Table 3 along with their DC saturation flux density, initial permeability, coercive force, and Curie temperature. The first thin film of 0.7 μm thick was formed by sputtering.

conventional manner.

The magnetic head was operated with a floppy disk having a coercive force Hc of 1300 Oe at a track width of 120 μm to determine the overwrite and resolution. The head was set such that the first or low saturation magnetic flux density thin film 3 was on the leading side relative to the rotating floppy disk. The measurement procedures were the same as described in Example 3.

The results are shown in Table 3.

TABLE 3

| | High saturation flux density thin film | | | | Low saturation flux density thin film | | | | | Over- | |
|---|---|---|---|---|---|---|---|---|---|---|---|
| Sample No. | Composition (at %) | Saturation flux density (G) | Initial permeability | Coercive force (Oe) | Composition (at %) | Saturation flux density (G) | Initial permeability | Coercive force (Oe) | Curie Temp. (°C.) | write ability (dB) | Resolution (%) |
| 301 | $Fe_{85}Si_9Al_5Cr_1$ | 11000 | 2800 | 0.15 | $Fe_{4.5}Co_{70.5}Si_{15}B_{10}$ | 2500 | 2300 | 0.02 | 180 | −32 | 80 |
| 302 | $Fe_{85}Si_9Al_5Cr_1$ | 11000 | 2800 | 0.15 | $Fe_{4.5}Co_{65.5}Ni_5Si_{15}B_{10}$ | 2000 | 2500 | 0.01 | 140 | −36 | 74 |
| 303 | $Fe_{85}Si_9Al_5Cr_1$ | 11000 | 2800 | 0.15 | $Fe_{4.5}Co_{65.5}Cr_5Si_{15}B_{10}$ | 1600 | 3200 | 0.05 | 125 | −39 | 71 |
| 304 | $Fe_{85}Si_9Al_5Cr_1$ | 11000 | 2800 | 0.15 | $Fe_{4.5}Co_{65.5}C_5P_{15}B_{10}$ | 1850 | 2600 | 0.18 | 135 | −37 | 72 |
| 305 | $Fe_{85}Si_9Al_5Cr_1$ | 11000 | 2800 | 0.15 | $Fe_{4.5}Co_{75}Si_{10.5}B_{10}$ | 3500 | 1600 | 0.50 | 280 | −18 | 82 |
| 306 | $Fe_{85}Si_9Al_5Cr_1$ | 11000 | 2800 | 0.15 | $Fe_{4.5}Co_{60}Ni_{5.5}Si_{15}B_{15}$ | 1080 | 3600 | 0.03 | 95 | −45 | 63 |
| 307 | $Fe_{86}Si_{4.5}Al_{8.5}Cr_1$ | 12300 | 2900 | 0.10 | $Fe_{4.5}Co_{70.5}Si_{15}B_{10}$ | 2500 | 2300 | 0.02 | 180 | −33 | 80 |
| 308 | $Fe_{84}Si_{10}Al_5Cr_1$ | 10500 | 2500 | 0.15 | $Fe_{4.5}Co_{70.5}Si_{15}B_{10}$ | 2500 | 2300 | 0.02 | 180 | −32 | 80 |
| 309 | $Fe_{90}Si_4Al_5Cr$ | 13200 | 300 | 4.8 | $Fe_{4.5}Co_{70.5}Si_{15}B_{10}$ | 2500 | 2300 | 0.02 | 180 | −34 | 80 |
| 310 | $Fe_{80}Si_9Al_{10}Cr$ | 8000 | 500 | 2.0 | $Fe_{4.5}Co_{70.5}Si_{15}B_{10}$ | 2500 | 2300 | 0.02 | 180 | −28 | 80 |

Sample Nos. 309 and 310 failed to reproduce a satisfactory output.

The effectiveness of the invention is apparent from the data of Table 3.

Example 7

Magnetic heads were fabricated by the same procedure as in Example 6 except that the second or high saturation magnetic flux density thin film was replaced by the following compositions:
$Fe_{77}Ga_9Si_{14}$ (wt %) and
$Fe_{95.5}Si_{4.5}$ (wt %).

The heads were evaluated as in Example 6. It was found that their properties were equivalent to those samples of Example 6 within the scope of the invention.

Example 8

An EDG magnetic head as shown in FIG. 3 was fabricated in which the underlay 6 was disposed between the second core 2 and the second or high saturation flux density thin film 5. This head is designated sample No. 401.

The composition, thickness and magnetic properties of the underlayer 6, the second thin film 5, and the first thin film are shown below. These coatings were formed by sputtering.

Underlay

Composition: $Ni_{80}Fe_{20}$ (wt %)
Thickness: 0.02 μm
DC saturation flux density: 10,000 G
Initial permeability: 1,500
Coercive force: 0.2 Oe

High saturation flux density thin film

Composition: Sendust $Fe_{85}Al_5Si_9Cr_1$ (wt %)
Thickness: 2.0 μm
DC saturation flux density: 11,000 G
Initial permeability: 2,800
Coercive force: 0.15 Oe

Low saturation flux density thin film

Composition: Co amorphous alloy $Co_{75}Zr_{10}Mo_{15}$ (at %)
Thickness: 1.0 μm
DC saturation flux density: 2,500 G
Initial permeability: 1,500
Coercive force: 0.15 Oe The cores were formed of an Mn-Zn ferrite having a DC saturation flux density of 4,500 G, an initial permeability of 3,000, a coercive force of 0.1 Oe.

The nonmagnetic spacer 4 was formed from $SiO_2$ and had a thickness of 0.4 μm. A conductor was wound around the head to form a coil of 100×2 turns in a conventional manner.

For comparison purposes, a magnetic head designated sample No. 402 was prepared by the same procedure as above except that the underlay was omitted.

Each magnetic head was operated with a floppy disk having a coercive force Hc of 1300 Oe at a track width of 120 μm to determine the pseudo-gap formation, overwrite and resolution. The head was set such that the first or low saturation magnetic flux density thin film was on the leading side relative to the rotating floppy disk.

With respect to overwrite and resolution, their measurement procedures were the same as described in Example 3.

Pseudo-gap formation

A signal at a frequency of 10 kHz was recorded. An isolated waveform was then reproduced to determine the percentage of a pseudo pulse relative to a primary pulse. A data error will occur when the pseudo pulse exceeds 10%.

The results are shown in Table 4.

Table 4

TABLE 4

| Sample No. | Pseudo pulse | Overwrite ability | Resolution |
| --- | --- | --- | --- |
| 401 | 0% | −32 dB | 82% |
| 402 | 20% | −32 dB | 82% |

Example 9

Magnetic heads were fabricated by substantially the same procedure as in Example 8. The first or low saturation flux density thin film and the second or high saturation flux density thin film were combined as shown in Table 5.

The underlay used in these samples is the same as described in Example 8.

TABLE 5

| | High saturation flux density thin film | | | | Low saturation flux density thin film | | | | |
| --- | --- | --- | --- | --- | --- | --- | --- | --- | --- |
| Sample No. | Composition (at %) | Saturation flux density(G) | Initial permeability | Coercive force(Oe) | Composition (at %) | Saturation flux density(G) | Initial permeability | Coercive force(Oe) | Curie Temp. (°C.) |
| 501 | $Fe_{85}Si_9Al_5Cr_1$ | 11000 | 2800 | 0.15 | $Co_{75}Zr_{10}Mo_{15}$ | 2500 | 1500 | 0.15 | 350 |
| 502 | $Fe_{85}Si_9Al_5Cr_1$ | 11000 | 2800 | 0.15 | $Co_{75}Zr_{15}Cr_{10}$ | 2200 | 1500 | 0.20 | 310 |
| 503 | $Fe_{85}Si_9Al_5Cr_1$ | 11000 | 2800 | 0.15 | $Co_{73}Zr_{15}Mo_{12}$ | 2000 | 2000 | 0.10 | 280 |
| 504 | $Fe_{85}Si_9Al_5Cr_1$ | 11000 | 2800 | 0.15 | $Co_{73}Zr_{15}Cr_{12}$ | 1800 | 2000 | 0.15 | 180 |
| 505 | $Fe_{86}Si_8Al_5Cr_1$ | 11800 | 2500 | 0.2 | $Co_{75}Zr_{10}Mo_{15}$ | 2500 | 1500 | 0.15 | 350 |
| 506 | $Fe_{84}Si_{10}Al_5Cr_1$ | 10500 | 2400 | 0.2 | $Co_{75}Zr_{15}Cr_{10}$ | 2200 | 1500 | 0.20 | 310 |
| 507 | $Fe_{90}Si_4Al_5Cr_1$ | 13200 | 300 | 5.0 | $Co_{75}Zr_{10}Mo_{15}$ | 2500 | 1500 | 0.15 | 350 |
| 508 | $Fe_{80}Si_{14}Al_5Cr_1$ | 8600 | 500 | 3.0 | $Co_{75}Zr_{15}Cr_{10}$ | 2200 | 1500 | 0.20 | 310 |
| 509 | $Fe_{85}Si_9Al_5Cr_1$ | 11000 | 2800 | 0.15 | $Fe_{4.5}Co_{70.5}Si_{15}B_{10}$ | 2500 | 2300 | 0.02 | 180 |
| 511 | $Fe_{85}Si_9Al_5Cr_1$ | 11000 | 2800 | 0.15 | $Fe_{4.5}Co_{65.5}Ni_5Si_{15}B_{10}$ | 2000 | 2500 | 0.01 | 140 |
| 512 | $Fe_{85}Si_9Al_5Cr_1$ | 11000 | 2800 | 0.15 | $Fe_{4.5}Co_{65.5}Cr_5Si_{15}B_{10}$ | 1600 | 3200 | 0.05 | 125 |
| 513 | $Fe_{85}Si_9Al_5Cr_1$ | 11000 | 2800 | 0.15 | $Fe_{4.5}Co_{65.5}C_5P_{15}B_{10}$ | 1850 | 2600 | 0.18 | 135 |
| 514 | $Fe_{86}Si_{4.5}Al_{8.5}Cr_1$ | 12300 | 2900 | 0.10 | $Fe_{4.5}Co_{70.5}Si_{15}B_{10}$ | 2500 | 2300 | 0.02 | 180 |
| 515 | $Fe_{84}Si_{10}Al_5Cr_1$ | 10500 | 2500 | 0.15 | $Fe_{4.5}Co_{70.5}Si_{15}B_{10}$ | 2500 | 2300 | 0.02 | 180 |
| 516 | $Fe_{90}Si_4Al_5Cr_1$ | 13200 | 300 | 4.8 | $Fe_{4.5}Co_{70.5}Si_{15}B_{10}$ | 2500 | 2300 | 0.02 | 180 |
| 517 | $Fe_{80}Si_9Al_{10}Cr_1$ | 8000 | 500 | 2.0 | $Fe_{4.5}Co_{70.5}Si_{15}B_{10}$ | 2500 | 2300 | 0.02 | 180 |

These samples were evaluated for the same properties as in Example 8, finding approximately equivalent results to those of Example 8.

Example 10

Magnetic heads were fabricated by the same procedure as in Examples 8 and 9 except that the second or high saturation flux density thin film was replaced by the following compositions:

$Fe_{77}Ga_9Si_{14}$ (wt %) and
$Fe_{95.5}Si_{4.5}$ (wt %).

The heads were evaluated as in Example 8. It was found that their properties were equivalent to those samples of Example 8.

Example 11

EDG magnetic heads as shown in FIG. 5 were fabricated by joining the components with bonding glass.

An amorphous material was used as the second or high saturation flux density thin film 5. For comparison purposes, some magnetic heads were fabricated using a crystalline material as the second or high saturation flux density thin film 5.

The glass used for bonding was lead borosilicate glass of a composition: $70PbO\text{-}11B_2O_3\text{-}10SiO_2\text{-}3Al_2O_3\text{-}6ZnO$ in weight percent and having a working temperature Tw of 530° C.

The compositions of the first or low saturation magnetic flux density thin film 3 are shown in Table 6 along with their DC saturation flux density, initial permeability, coercive force, and Curie temperature. The first thin film of 1.0 μm thick was formed by sputtering.

The compositions of the second or high saturation flux density thin film 5 are shown in Table 6 together with their DC saturation flux density, initial permeability, and coercive force. The second thin film of 2.0 μm thick was formed by 5 sputtering.

The cores were formed of an Mn-Zn ferrite having a DC saturation flux density of 4,500 G, an initial permeability of 3,000, a coercive force of 0.1 Oe.

The nonmagnetic spacer 4 was formed from $SiO_2$ and had a thickness of 0.4 μm. A conductor was wound around the head to form a coil of 100×2 turns in a conventional manner.

The magnetic head was operated with a floppy disk having a coercive force of 1,300 Oe at a track width of 120 μm to determine the following properties. The head was set such that the first or low saturation flux density thin film 3 was on the leading side relative to the rotating floppy disk.

Pseudo-gap formation

Same as in Example 8.

Overwrite ability

Same as in Example 3.

Resolution

Same as in Example 3.
The results are shown in Table 6.

The magnetic heads of sample Nos. 604 and 608 produced more than 10% pseudo-pulses due to the pseudo-gap, which caused data errors.

Example 12

DGL magnetic heads as shown in FIG. 4 were fabricated by joining the components with bonding glass.

The composition of lead borosilicate glass used in bonding is shown in Table 7 together with its working temperature Tw.

TABLE 7

| Glass No. | Lead borosilicate glass Composition (wt %) | Tw (°C.) |
|---|---|---|
| G1 | $74PbO\text{--}10B_2O_3\text{--}9SiO_2\text{--}2Al_2O_3\text{--}5ZnO$ | 470 |
| G2 | $70PbO\text{--}11B_2O_3\text{--}10SiO_2\text{--}3Al_2O_3\text{--}6ZnO$ | 530 |
| G3 | $69PbO\text{--}5B_2O_3\text{--}15SiO_2\text{--}2Al_2O_3\text{--}9Bi_2O_3$ | 580 |
| G4 | $65PbO\text{--}10B_2O_3\text{--}23SiO_2\text{--}2Al_2O_3$ | 620 |
| G5 | $57PbO\text{--}13B_2O_3\text{--}15SiO_2\text{--}5Al_2O_3\text{--}10ZnO$ | 670 |

The compositions of the first or low saturation flux density thin film 3 are shown in Table 8 together with their DC saturation flux density, initial permeability, coercive force, and Curie temperature. The first thin film of 1.0 μm thick was formed by sputtering.

The cores were formed of an Mn-Zn ferrite having a DC saturation flux density of 4,500 G, an initial permeability of 3,000, a coercive force of 0.1 Oe.

The nonmagnetic spacer 4 was formed from $SiO_2$ and had a thickness of 0.4 μm. A conductor was wound around the head to form a coil of 100×2 turns in a conventional manner.

The magnetic head was operated with a floppy disk having a coercive force of 600 Oe at a track width of 120 μm to determine the overwrite ability and resolution. The head was set such that the first o low saturation flux density thin film 3 was on the leading side relative to the rotating floppy disk. The measurement procedures are the same as described in Example 3.

The results are shown in Table 8.

TABLE 6

| | High saturation flux density thin film | | | | Low saturation flux density thin film | | | | | | | |
|---|---|---|---|---|---|---|---|---|---|---|---|---|
| Sample No. | Composition (at %) | Saturation flux density (G) | Initial permeability | Coercive force (Oe) | Composition (at %) | Saturation flux density (G) | Initial permeability | Coercive force (Oe) | Curie Temp. (°C.) | Pseudo pulse (%) | Overwrite ability (dB) | Resolution (%) |
| 601 | $Co_{87}Zr_5Nb_8$ | 11000 | 2800 | 0.2 | $Co_{75}Zr_{10}Mo_{15}$ | 2500 | 1500 | 0.15 | 350 | 5 | −33 | 80 |
| 602 | $Co_{86}Zr_5Ta_9$ | 10000 | 2500 | 0.3 | $Co_{75}Zr_{10}Mo_{15}$ | 2500 | 1500 | 0.15 | 350 | 0 | −32 | 80 |
| 603 | $Fe_{4.5}Co_{75.5}Si_2B_{18}$ | 11000 | 2000 | 0.2 | $Co_{75}Zr_{10}Mo_{15}$ | 2500 | 1500 | 0.15 | 350 | 5 | −33 | 80 |
| 604 | $Fe_{85}Si_9Al_5Cr_1$* | 11000 | 2800 | 0.15 | $Co_{75}Zr_{10}Mo_{15}$ | 2500 | 1500 | 0.15 | 350 | 20 | −33 | 80 |
| 605 | $Co_{87}Zr_5Nb_8$ | 11000 | 2800 | 0.2 | $Fe_{4.5}Co_{65.5}Ni_5Si_{15}B_{10}$ | 2000 | 2500 | 0.01 | 140 | 5 | −36 | 74 |
| 606 | $Co_{86}Zr_5Ta_9$ | 10000 | 2500 | 0.3 | $Fe_{4.5}Co_{65.5}Ni_5Si_{15}B_{10}$ | 2000 | 2500 | 0.01 | 140 | 0 | −35 | 74 |
| 607 | $Fe_{4.5}Co_{75.5}Si_2B_{18}$ | 11000 | 2000 | 0.2 | $Fe_{4.5}Co_{65.5}Ni_5Si_{15}B_{10}$ | 2000 | 2500 | 0.01 | 140 | 5 | −36 | 74 |
| 608 | $Fe_{85}Si_9Al_5Cr_1$* | 11000 | 2800 | 0.15 | $Fe_{4.5}Co_{65.5}Ni_5Si_{15}B_{10}$ | 2000 | 2500 | 0.01 | 140 | 20 | −36 | 74 |

*wt %

TABLE 8

| | | Low saturation flux density thin film | | | | | Overwrite | |
|---|---|---|---|---|---|---|---|---|
| Sample No. | Glass No. | Composition (at %) | Saturation flux density (G) | Initial permeability | Coercive force (Oe) | Curie Temp. (°C.) | ability (dB) | Resolution (%) |
| 801 | G1 | $Fe_{4.5}Co_{70.5}Si_{15}B_{10}$ | 2500 | 2300 | 0.02 | 180 | −34 | 76 |
| 802 | G2 | $Co_{75}Zr_{15}Cr_{10}$ | 2200 | 1500 | 0.20 | 310 | −35 | 75 |
| 803 | G3 | $Fe_{4.5}Co_{65.5}Zr_5Si_{15}B_{10}$ | 1800 | 1900 | 0.18 | 135 | −37 | 73 |
| 804 | G4 | $Fe_{4.5}Co_{70.5}Si_{15}B_{10}$ | 3000 | 800 | 1.5 | 240 | −25 | 68 |
| 805 | G5 | $Co_{75}Zr_{15}Cr_{10}$ | 3000 | 500 | 1.5 | 230 | −25 | 68 |
| 806 | G1 | $Co_{78}Zr_{10}Mo_{12}$ | 3500 | 500 | 2.5 | 450 | −28 | 78 |

TABLE 8-continued

| Sample No. | Glass No. | Low saturation flux density thin film | | | | | Overwrite ability (dB) | Resolution (%) |
|---|---|---|---|---|---|---|---|---|
| | | Composition (at %) | Saturation flux density(G) | Initial permeability | Coercive force(Oe) | Curie Temp. (°C.) | | |
| 807 | G2 | $Fe_{4.5}Co_{60}Cr_{5.5}W_5Si_{15}B_{10}$ | 900 | 2400 | 0.15 | 100 | −43 | 68 |

Sample Nos. 801 and 804 used thin films of the same composition, but different glass compositions. Because of bonding glass G4 having Tw of 620° C., sample No. 804 shows less satisfactory properties as demonstrated by an increase of Bs from 2500 G to 3000 G and a reduction of μ from 2300 to 800.

Example 13

EDG magnetic heads as shown in FIG. 5 were fabricated by joining the components with bonding glass.

The lead borosilicate glass used for bonding was selected from Table 7 and identified with glass number in Table 9.

The compositions of the first or low saturation flux density thin film 3 are shown in Table 9 along with their DC saturation flux density, initial permeability, coercive force, and Curie temperature. The first thin film of 1.0 μm thick was formed by sputtering.

The compositions of the second or high saturation flux density thin film 5 are shown in Table 9 together with their DC saturation flux density, initial permeability, and coercive force. The second thin film of 2.0 μm thick was formed by sputtering.

The cores were formed of an Mn-Zn ferrite having a DC saturation flux density of 5,500 G, an initial permeability of 3,000, a coercive force of 0.1 Oe.

The nonmagnetic spacer 4 was formed from $SiO_2$ and had a thickness of 0.4 μm. A conductor was wound around the head to form a coil of 100×2 turns in a conventional manner.

The magnetic head was operated with a floppy disk having a coercive force of 900 Oe at a track width of 120 μm to determine the following properties. The head was set such that the first or low saturation flux density thin film 3 was on the leading side relative to the rotating floppy disk.

Overwrite ability

A signal having a frequency 1f of 1.25 MHz was recorded in the disk and another signal having a frequency 2f of 2.5 MHz was then overwritten. Overwrite ability was evaluated by dividing the 1f-signal output after overwriting by the 1f-signal output prior to overwriting. The overwrite ability was evaluated satisfactory when the value is between −30 dB and −40 dB. A value of higher than −30 dB is insufficient as overwrite ability. An overwrite value of lower than −40 dB is great as such, but impractical in view of interchangeability with magnetic heads other than the present invention.

Resolution

A signal having a frequency 1f of 1.25 MHz was recorded in the disk and then reproduced to give an output V1f. Another signal having a frequency 2f of 2.5 MHz was recorded and then reproduced to give an output V2f. The resolution is defined as output V2f divided by V1f.

V2f/V1f x 100%

A resolution of less than about 70% is short for practical use.

The results are shown in Table 9.

TABLE 9

| Sample No. | Glass No. | High saturation flux density thin film | | | | Low saturation flux density thin film | | | | | Overwrite ability (dB) | Resolution (%) |
|---|---|---|---|---|---|---|---|---|---|---|---|---|
| | | Composition (at %) | Saturation flux density (G) | Initial permeability | Coercive force (Oe) | Composition (at %) | Saturation flux density (G) | Initial permeability | Coercive force (Oe) | Curie Temp. (°C.) | | |
| 901 | G1 | $Fe_{85}Si_9Al_5Cr_1$ | 11000 | 2800 | 0.15 | $Co_{75}Zr_{10}Mo_{15}$ | 2500 | 1500 | 0.15 | 350 | −33 | 80 |
| 902 | G2 | $Fe_{85}Si_9Al_5Cr_1$ | 11000 | 2800 | 0.15 | $Fe_{4.5}Co_{65.5}Ni_5Si_{15}B_{10}$ | 2000 | 2500 | 0.01 | 140 | −36 | 74 |
| 903 | G3 | $Fe_{85}Si_9Al_5Cr_1$ | 11000 | 2800 | 0.15 | $Co_{73}Zr_{15}Cr_{12}$ | 1800 | 2000 | 0.15 | 180 | −40 | 72 |
| 904 | G4 | $Fe_{80}Si_{14}Al_5Cr_1$ | 8600 | 500 | 3.0 | $Co_{75}Zr_{10}Mo_{15}$ | 3000 | 500 | 1.5 | 230 | −22 | 68 |
| 905 | G5 | $Fe_{80}Si_{14}Al_5Cr_1$ | 8600 | 500 | 3.0 | $Fe_{4.5}Co_{65.5}Ni_5Si_{15}B_{10}$ | 2800 | 800 | 1.5 | 240 | −23 | 68 |
| 906 | G1 | $Fe_{80}Si_{14}Al_5Cr_1$ | 8600 | 500 | 3.0 | $Fe_{4.5}Co_{75}Si_{10.5}B_{10}$ | 3500 | 1600 | 0.50 | 280 | −18 | 82 |
| 907 | G2 | $Fe_{80}Si_{14}Al_5Cr_1$ | 8600 | 500 | 3.0 | $Co_{72}Zr_{16}Cr_{12}$ | 1300 | 1000 | 0.60 | 80 | −43 | 65 |

Obviously many modifications and variations of the present invention are possible in the light of the above teachings. It is therefore to be understood that within the scope of the appended claims, the invention may be practiced otherwise than as specifically described.

We claim:

1. A magnetic head, comprising:
   a first core and a second core;
   a non-magnetic spacer between said first core and said second core; and
   a first thin film of an amorphous alloy having a saturation magnetic flux density of 1,500 to 3,000 G positioned between the first core and the non-magnetic spacer, said first thin film having a lower saturation magnetic flux density than said first core and said second core, and said first core and said second core being bonded together by glass.

2. The magnetic head of claim 1 wherein said cores are formed of a ferrite having a saturation magnetic flux density of 4,000 to 6,000 G.

3. The magnetic head of claim 1 wherein said first thin film is formed of an amorphous alloy comprising Co,
   at least one member selected from the group consisting of Fe, Ni, and Cr, and
   at least one member selected from the group consisting of Si, B, P, and C.

4. The magnetic head of claim 3 wherein said first thin film is formed of an amorphous alloy having an atomic composition represented by the following formula:

$$(Co_{1-p-q-r}Fe_pNi_qCr_r)_{1-x}M_x$$

wherein consisting of Si, B, P, and C,.
letters x, p, q, and r are within the ranges:

$$0.05 \leq x \: 0.3,$$

$$0 \leq p \leq 0.15,$$

$$0 \leq q \leq 0.55, \text{ and}$$

$$0 \leq r \leq 0.1,$$

all p, q, and r are not equal to zero at the same time.

5. The magnetic head of claim 18 wherein said first thin film is formed of an amorphous alloy comprising
Co,
at least one member selected from the group consisting of Zr, Hf, Ti, Y, Si, and B, and
at least one member selected from the group consisting of V, Nb, Ta, Cr, Mo, and W.

6. The magnetic head of claim 5 wherein said first thin film is formed of an amorphous alloy comprising
70 to 80 atom % of Co,
up to 30 atom % of at least one member selected from the group consisting of Zr, Hf, Ti, Y, Si, and B, and
up to 30 atom % of at least one member selected from the group consisting of V, Nb, Ta, Cr, Mo, and W.

7. The magnetic head of claim 1, 5 or 6 which further comprises a second thin film between said second core and said nonmagnetic spacer, said second thin film having a higher saturation magnetic flux density than said first and second cores.

8. The magnetic head of claim 7 wherein said second thin film has a saturation magnetic flux density of 9,000 to about 14,000 G.

9. The magnetic head of claim 8 wherein said second thin film is formed of an alloy selected from the group consisting of Fe-Al-Si base alloys, Fe-Ga-Si base alloys, and Fe-Si base alloys.

10. The magnetic head of claim 9 which further comprises an underlay of a Permalloy between said second core and said second thin film.

11. The magnetic head of claim 8 wherein said second thin film is formed of an amorphous alloy.

12. The magnetic head of claim 11 wherein said second thin film is formed of an amorphous alloy comprising
Co,
at least one member selected from the group consisting of Fe, Ni, and Cr, and
at least one member selected from the group consisting of Si, B, P, and C.

13. The magnetic head of claim 11 wherein said second thin film is formed of an amorphous alloy comprising
Co,
at least one member selected from the group consisting of Zr, Hf, Ti, Y, Si, and B, and
at least one member selected from the group consisting of V, Nb, Ta, Cr, Mo, and W.

14. The magnetic head of claim 1 wherein said first core is joined to said second core using a fusion bondable glass, said glass being of a lead borosilicate glass composition comprising 60 to 80% by weight of PbO, 1 to 15% by weight of $B_2O_3$, and 5 to 20% by weight of $SiO_2$.

15. The magnetic head of claim 14 wherein said lead borosilicate glass composition further comprises at least one member selected from the group consisting of up to 5% by weight of $Al_2O_3$, up to 12% by weight of ZnO, and up to 15% by weight of $Bi_2O_3$.

* * * * *

UNITED STATES PATENT AND TRADEMARK OFFICE
CERTIFICATE OF CORRECTION

PATENT NO. : 5,029,032

DATED : July 2, 1991

INVENTOR(S) : Taiki Yamada et al.

It is certified that error appears in the above-identified patent and that said Letters Patent is hereby corrected as shown below:

Title page item (75):
    The sixth inventor's name is incorrect, should be,

--Kazuaki Suzuki--.

Signed and Sealed this

Tenth Day of November, 1992

Attest:

DOUGLAS B. COMER

*Attesting Officer*     *Acting Commissioner of Patents and Trademarks*

UNITED STATES PATENT AND TRADEMARK OFFICE
CERTIFICATE OF CORRECTION

PATENT NO. : 5,029,032
DATED : JULY 2, 1991
INVENTOR(S) : TAIKI YAMADA ET AL

It is certified that error appears in the above-identified patent and that said Letters Patent is hereby corrected as shown below:

Title Page [21] change "365,696" to --356,696--;

Col. 23, Line 6, after "wherein" insert --M is at least one member selected from the group";

Col. 23, Line 9, after "x" insert --$\leq$--.

Signed and Sealed this

Nineteenth Day of January, 1993

*Attest:*

DOUGLAS B. COMER

*Attesting Officer*  *Acting Commissioner of Patents and Trademarks*